July 16, 1929.　　　　J. GALBRAITH　　　　1,721,015
CARVING MACHINE
Filed Nov. 26, 1926　　　4 Sheets-Sheet 4

INVENTOR.
JOHN GALBRAITH.
BY HIS ATTORNEYS.

Patented July 16, 1929.

1,721,015

UNITED STATES PATENT OFFICE.

JOHN GALBRAITH, OF MINNEAPOLIS, MINNESOTA.

CARVING MACHINE.

Application filed November 26, 1926. Serial No. 150,731.

This invention relates to a carving machine, and particularly to a carving machine for carving wood or similar materials, and in which a multiplicity of articles are simultaneously carved. In such machines a plurality of cutting tools are used, which are moved in unison, being controlled by a tracer which is moved over the pattern having the desired contour of the pieces to be carved.

It is an object of this invention, therefore, to provide a carving machine having a plurality of tool heads each of which is carried on a swinging arm, said arms being suitably connected for operation in unison.

It is a further object of the invention to provide a carving machine comprising a plurality of tool carrying heads, each carried on an individual arm, each of which arms carries a driving mechanism for said head.

It is still another object of the invention to provide a carving machine comprising a plurality of tools, each carried by a separate arm, which arms are swingingly mounted on a common member which is movable forwardly and rearwardly.

It is still a further object of the invention to provide a carving machine comprising a frame having two portions which are simultaneously movable vertically, on which travels a carriage in a horizontal forward and rearward direction, which carriage comprises a member swingable about a horizontal axis on which are swingingly mounted a plurality of arms, each of which carries a cutting tool as its forward end, each head having a driving mechanism, said arms being arranged in pairs, one of each pair carrying a driving motor.

It is still another object of the invention to provide a carving machine having a plurality of tools having in combination with each thereof a pair of centering members, one set of said centering devices being arranged for common movement and the other set being manually movable but having a locking means in connection therewith.

It is an object of the invention to provide a carving machine having a plurality of cutting tools, each arranged with a rotating head, which head is driven by a pulley secured thereto in a novel manner and carrying a ball bearing mounted in a novel manner.

These and other objects and advantages of the invention will be fully set forth in the following description made in connection with the accompanying drawings, in which like reference characters refer to similar parts throughout the several views and in which:—

Referring to the drawings, the machine comprises a frame having the end members 20 adapted to rest on a suitable support, which members are connected by the longitudinally extending rear members 21 and the front longitudinally extending members 22. Each end member 20 has brackets 20ª and 20ᵇ projecting at each end thereof, in which move the screws 23. The brackets 20ᵇ have auxiliary brackets 24 thereon in which is journaled a shaft 25. The shaft 25 has secured thereto worm gears 26 meshing with worm wheel gears 27 carried in brackets 24 which are formed as nuts engaging the screw 23, so that when gears 27 are turned, the screws will be moved upwardly or downwardly. The shafts 25 have sprockets 28 secured to their rear ends beyond the brackets 24, which sprockets are connected by an endless chain 29. The shafts 25 at their forward ends are of angular cross section to receive the crank handles 30 by which they are turned. The upper ends of screws 23 are reduced and received between a pair of side rails 31 extending parallel with the end members 20, said screws being secured between said rails by suitable set screws 32.

Figures 13, 14:
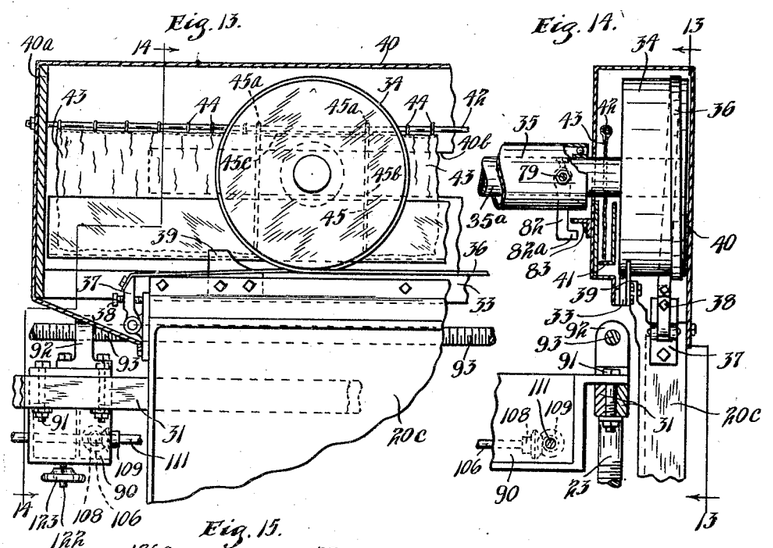
Fig. 13 is a vertical section on line 13—13 of Fig. 14.
Fig. 14 is a vertical section on line 14—14 of Fig. 13.

The frame members 20 have secured at their upper ends the brackets 20$^c$ having upwardly extending portions to which are bolted rails 33. Supported upon the rails 33 are the wheels or drums 34 in which is (secured a shaft 35$^a$ carrying spaced ball bearings on which is) journaled a comparatively large and hollow shaft 35 which extends between said wheels at each end of the machine. Each drum 34 has a metal ribbon 36 extending therearound as shown in Figs. 13 and 14, one end of which ribbon is secured at one end of the bracket 20$^c$ and the other end of which is secured to a small pivoted bracket 37 secured to one end of the bracket 20$^c$, which bracket 37 is adjustable by a screw 38 extending therethrough and abutting bracket 20$^c$ at one end thereof. Brackets 39 are also secured to rail 33 adjacent one end thereof extending above rail 33 and in the path of roller 34, limiting the movement of said roller forwardly and rearwardly. A casing 40 is provided, of substantially rectangular form, having a horizontal top and extending about the roller 34 and being of sufficient length to enclose the roller throughout the travel thereof, said casing having the end portions 40$^a$ disposed at the ends of the rails 33. The casing 40 has a slot 40$^b$ in its inner side through which shaft 35 extends and travels. It is quite important that no dirt or refuse collect on top of the rails 33 on which roller 34 runs, and a shield 41 of angular shape having a horizontal lower portion is provided, extending outwardly at the lower portion of the casing 40 and at the inner side thereof below the shaft 35. A rod 42 extends lengthwise through casing 40 being secured in the ends thereof, which rod supports a pair of curtain sections 43. The curtains 43 are of fabric material and are supported from the rod 42 by the rings 44 secured thereto. A yoke member 45 is provided, which may as illustrated be formed from a single piece of wire or a small rod, which has eyelets or loop portions 45$^a$ embracing the rod 42 and has depending arms 45$^b$ disposed at each side of the shaft 35, and received in the ends of curtain sections 43, said yoke having the intermediate or bight portion 45$^c$ extending between the loops 45$^a$.

The shaft 35 has spaced brackets 46 secured to the rear side thereof extending vertically and receiving at top and bottom, set screws 47 extending into the top and bottom portions of arms 48, which have openings 48$^a$ therein embracing the shaft 35. One of the arms 48 is disposed substantially at the center of the machine and is adapted to carry at its forward end the tracer or guide which is moved over the pattern, and the other arms are arranged in pairs. The arms 48 have vertically extending plate portions 48$^b$ in the rear of shaft 35, and one of the arms of each of said pairs has secured to said portion 48$^b$ a motor 49 illustrated as of electrical type. A bracket 50 is also secured to portion 48$^b$ forming a support for said motor and a bearing for the shaft thereof, to which shafts are secured a pair of flange pulleys 51 and 51$^a$ arranged one above the other. To the other head 48 of each pair, and to the portions 48$^b$ thereof, is secured a bracket 52 in which is journaled a shaft 53 to which is secured a pair of superposed flange pulleys 54 and 54$^a$. A belt 55 connects pulleys 51 and 54 so that the latter pulley is driven from the former. The arms 48 extend forwardly from shaft 35 and have recessed portions 48$^c$ at their forward ends at the bottom of which depends a threaded hub 48$^d$. A sleeve 56 is threaded into the hub 48$^d$ having a locking nut 57 thereon and having a tapered bore extending therethrough. Above the recess 48$^c$ the head 48 is recessed to receive the ball bearing shell 58 which is surmounted by a cap member 59 secured to the top of arm 48 by cap screws 60. The cap 59 is bored and threaded to receive oil or grease cups 59$^a$ and 59$^b$ shown in Fig. 7. A tool carrying spindle 61 is provided, reduced at its upper portion to extend through the inner race 58$^a$ of the ball bearing, and threaded at its top to receive the nut 62 which is tightened down on said race 58$^a$, said race seating on a shoulder at the upper end of said spindle 61. Below the ball bearing the spindle 61 has a flattened portion 61$^a$ which is of somewhat greater width than the cylindrical portion immediately below the same, said flattened portion extending into the groove formed in the top of the pulley 63 which surrounds the cylindrical portion of spindle 61 and which is secured thereto by a suitable set screw. A locking member 64 in the shape of a flat bar extends through a slot in the front end of the arm 48 and has a slot 64$^a$ at its rear embracing a headed and nutted bolt 65 disposed in the top of the arm 48, said member 64 resting on a washer on bolt 65. The plate 64 also has a slot 64$^b$ adjacent its forward end having an enlarged cylindrical portion, the slot 64$^b$ being of a width to fit about the flattened portion 61$^a$ of spindle 61 and the enlarged cylindrical portion being of a diameter somewhat greater than the longer dimension of the portion 61$^a$. The lower end of spindle 61 is split and threaded, the same also being tapered at its lower end. This lower portion receives a nut 67 adapted to compress the lower end of said spindle and clamp a suitable cutting tool 68 therein said nut and spindle thus forming a chuck. A belt 69 extends about the flanged pulley 63 and about pulleys 54$^a$ on one arm and 51$^a$ on the other arm of each pair respectively. The belts 69 are maintained properly tightened or tensioned by a tightener pulley 70 carried on a swinging arm 71 pivoted at the lower side of arm 48. The shaft 72 extending through arm 71 and carrying the pulley 70 is embraced by a rod 73 which extends through an aperture in the arm 48 and is threaded at its end to receive a wing nut 74. A coiled spring 75 surrounds rod 73 pressing against arm 48 at one end and against the wing nut 74 at its other end, said spring acting to hold pulley 70 against the belt 69. The tension of spring 75 can be regulated by adjusting nut 74.

The arms 48 are connected adjacent their forward ends by yokes 76 having set screws 77 extending therethrough from top and bottom and engaging in apertures 48$^e$ in arms 48, so that said yokes are pivotally connected to said arms. The set screws 77 are equipped with the usual jamb nuts. The yokes 76 have parallel arms 76$^a$ projecting at either side and the yokes secured to the various heads 48 are connected by short sleeves 78 fitting over arms 76$^a$ so that all of the yokes 76 connect substantially as one integral member.

The shaft 35 has a rod 79 rigidly secured therein adjacent the casing 40, which rod has thereon adjustable counter-weights 80 adapted to be held in place by suitable set screws 81. In the rear of shaft 35 the rod 79 carries a bracket 82 movable thereon and having outwardly projecting tongues 82$^a$ disposed above and below the horizontal flange of the angle bar 83 secured to casing 41, bracket 82 thus limiting the swinging movement of shaft 35 and arms 48 about the longitudinal axis of said shaft.

The shaft 35 also has spaced bracket 84 secured thereto and extending thereabove, carrying an electrical conduit 85 which has outlet boxes 86 at spaced intervals therein above the arms 48 carrying the members 49. A main distributing box 87 is carried by the conduit above the central arm 48. The electrical conductors for supplying current to the motors will enter box 87, having sufficient slack to permit the necessary movements of shaft 35 and these conductors will pass through the conduit 85 and out of the outlet boxes 86 to the motors 49.

Figure 1:
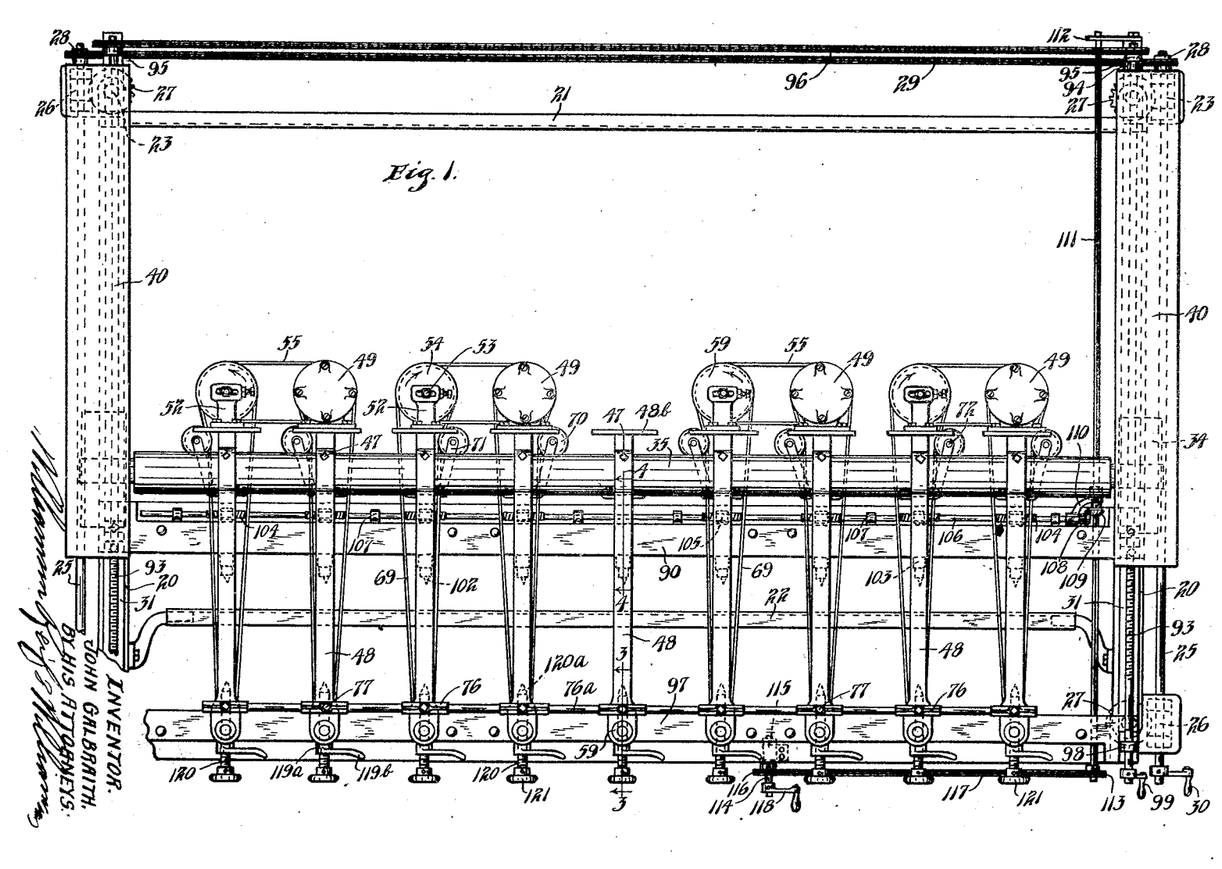
Fig. 1 is a plan view of the machine.
Figure 2:
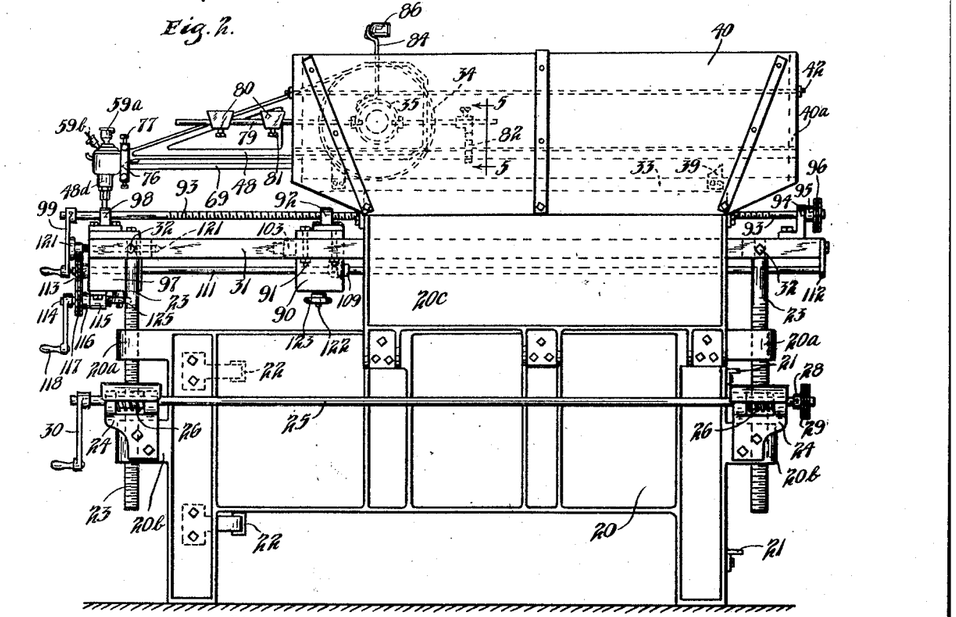
Fig. 2 is a view in end elevation thereof.

Member 90 extends between the rails 31 having a flange resting upon and slidable upon said rails, said flange being held in proper relation to the rails by the headed and nutted bolts 91. The member 90 has bearings 92 secured thereto threaded to form nuts through which extend the screws 93, said screws being journaled at their rear ends in bearings 94 secured to the rails 31 and having sprocket wheels 95 at their ends beyond bearings 94, which sprocket wheels at each side of the machine are connected by an endless chain 96. Another member 97 extends between the rails 31 at the front of the machine and also has flanges extending thereover and secured thereto. Bearings 98 are secured to the member 97, in which the front ends of screws 93 are journaled, said screws having crank handles 99 secured at their front ends. It will be seen that by turning the crank handles 99 the nuts 92 and thus the member 90 with all parts carried thereby, are moved forwardly and rearwardly. The member 90 has secured therein at spaced intervals the bearings 100 having shafts 101 journaled therein carrying at their front ends the centers 102 and the chuck or gripping members 103 having the sharpened projections 103$^a$ thereon at each side of the center 102. There is one of the centers 102 for each of the arms 48 and said centers and arms have their axes in vertical alinement. Each shaft 101 has a worm wheel gear 104 secured thereto at its rear end, which gears are engaged by the worm gears 105 secured to a shaft 106 which is mounted in bearings 107 secured to the rear side of member 90. A shield plate 128 shown as of right angular form is secured to the rear upper portion of member 90 and extends over the gears 104. The shaft 106 has a beveled gear 108 at one end thereof shown at the right hand end in Fig. 1, which beveled gear 108 meshes with another beveled gear 109 which is carried in the bearing 110 through which shaft 106 also passes. The gear 109 is splined to a shaft 111 extending forwardly and rearwardly at one end of the machine, being journaled in the members 90 and 97 and carried at its rear end in a bracket 112 secured to the end of rails 31. The shaft 111 has a sprocket wheel 113 secured at its forward end in front of the member 97. A shaft 114 is journaled in a bearing 115 secured to the member 97 and a sprocket 116 is secured to shaft 114 in alinement with the sprocket 113. The sprocket chain 117 extends over sprockets 113 and 116 and a crank handle 118 is secured to the front end of the shaft 114.

The member 97 has secured therein at spaced intervals, the bearings 119 in which are threaded the screws 120 having the centers 120$^a$ at their forward ends axially alined with the centers 102 and having the operating hand wheels 121 secured to their forward ends. Locking nuts 119$^a$ are also threaded on the screws 120 in front of bearings 119 which have the downwardly and outwardly extending handles 119$^b$ thereon.

Figures 3, 4, 5:
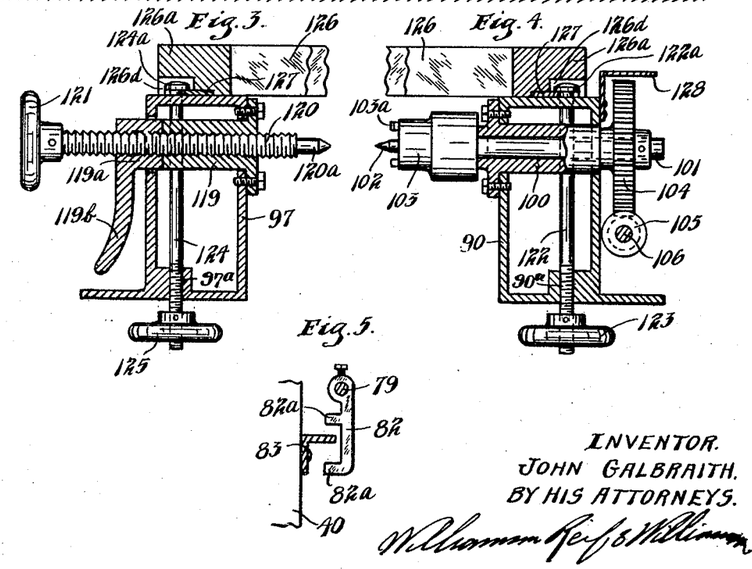
Fig. 3 is a vertical section taken on line 3—3 of Fig. 1.
Fig. 4 is a vertical section taken on line 4—4 of Fig. 1.
Fig. 5 is a vertical section taken on line 5—5 of Fig. 2.
Figures 15, 16:
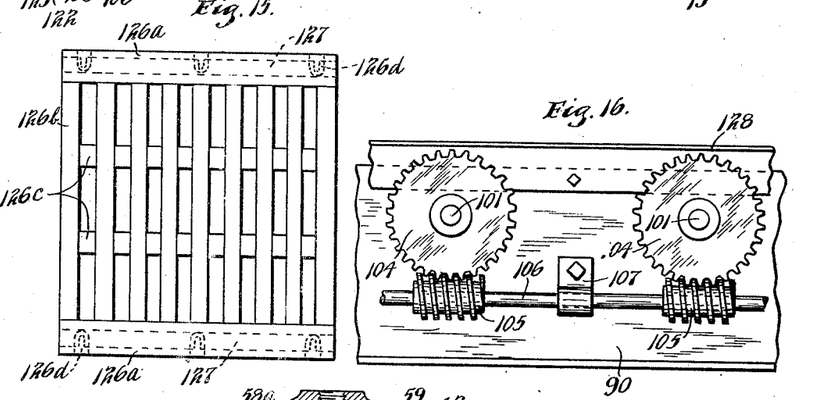
Fig. 15 is a plan view of one of the tables used with the machine.
Fig. 16 is a partial view in rear elevation as seen from the right of Fig. 4.
Figure 17:
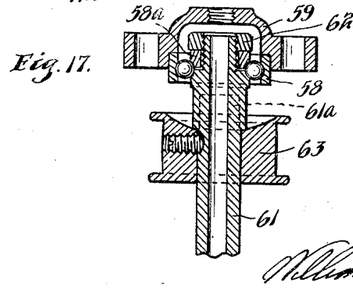
Fig. 17 is a partial vertical section taken on line 17—17 of Fig. 9.

The member 90 has mounted therein at spaced intervals the vertical bolts or rods 122 threaded to extend through and engage threads 90ª carried by members 90, and which have secured to their lower ends, hand wheels 123. The rods 122 have the enlarged portions or heads 122ª at their upper ends above the top surface of member 90. The member 97 also has members 124 similar to the members 122 mounted therein at spaced intervals which are threaded to extend through and engage threads 97ª carried by members 90, and which have secured to their lower ends the hand wheels 125. The members 124 have the enlarged portions or heads 124ª at their upper ends above the top surface of the member 97, it being noted that the top surfaces of members 90 and 97 lie in the same plane. Tables 126 are provided, adapted to be mounted upon the members 90 and 97, which tables are as shown in Fig. 15, of rectangular form in plan, comprising the end members 126ª between which extend the spaced bars 126ᵇ having the spacing members 126ᶜ therebetween. The members 126ª have recesses 126ᵈ therein, as shown in Figs. 3 and 4 and slotted plates 127 are set into members 126ª and flush with the lower sides thereof, said slotted members being adapted to embrace the rods 122 and 124.

Figures 6, 7, 8, 9, 10, 11, 12:
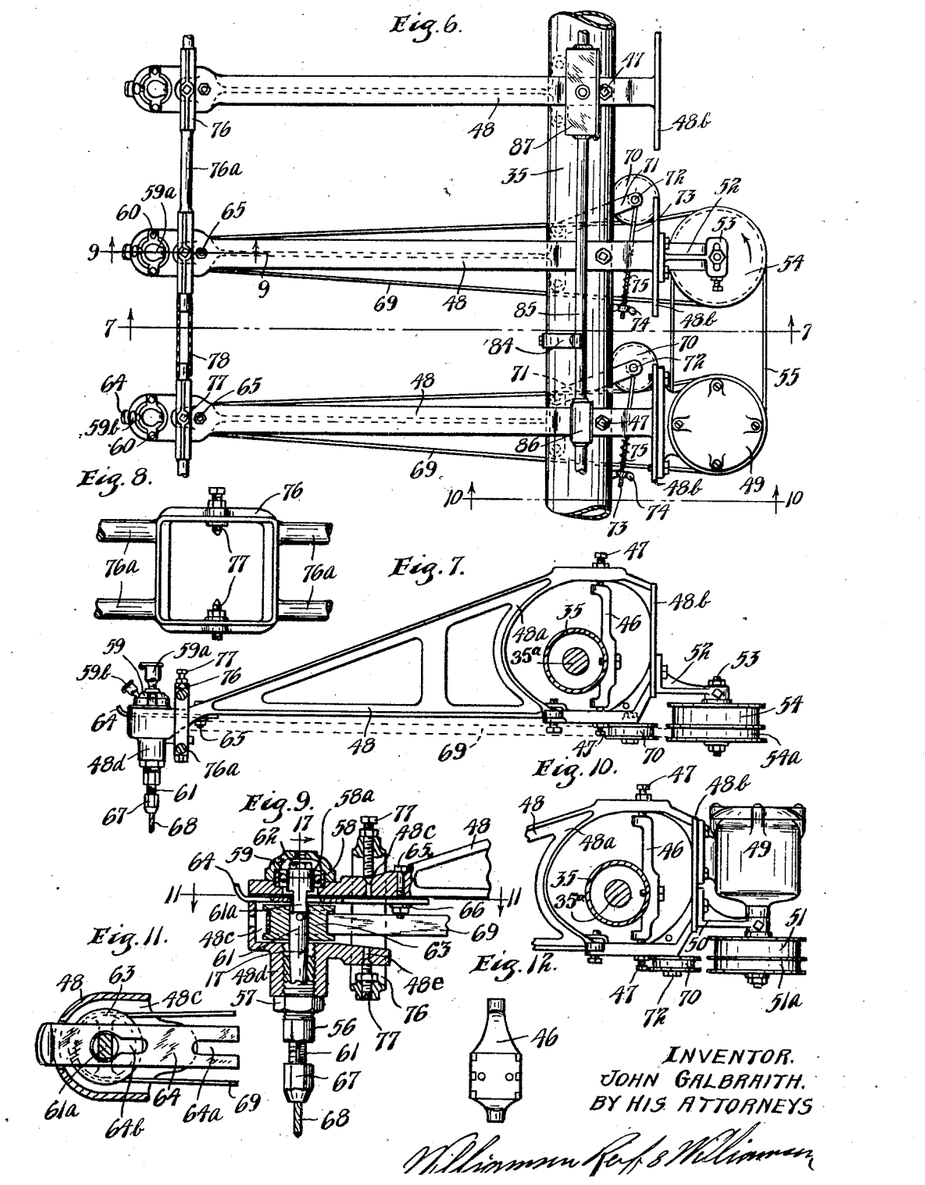
Fig. 6 is a partial plan view of the machine, some parts being shown in horizontal section.
Fig. 7 is a vertical section on line 7—7 of Fig. 6.
Fig. 8 is a partial view in front elevation as seen from the left of Fig. 6.
Fig. 9 is a vertical section on line 9—9 of Fig. 6.
Fig. 10 is a vertical section on line 10—10 of Fig. 6.
Fig. 11 is a horizontal section on line 11—11 of Fig. 9.
Fig. 12 is a view in front elevation of one of the arm supporting brackets.

In operation, if turned work is to be made, the pattern used will be placed in the centers 102 and 120ª below the central arm 48 and securely held by the member 103. It will be noted that by turning the crank handle 99, the member 90 may be moved forwardly and rearwardly to bring the centers to the proper and desired spacing. The pattern and pieces to be carved can thus be adjusted and properly held in the centers by turning the hand wheel 121 as desired, after which the centers 120 will be locked by manipulating the locking members 119ᵇ. It will also be seen that the rails 31 can be brought to the desired height by the operator turning crank 30, thus simultaneously moving all of the screws 23. The desired tools 68 will now be placed in the spindles 61 by manipulating the nuts 67. In order to manipulate the spindles 61 and nuts 67, it is necessary to lock the spindles against rotation. This is done by pulling outward the locking member 64 so that the narrow portion of slot 64ᵇ engages the flat portion 61ª of spindle 61, thus locking the same against rotation. After the tool is properly placed in the spindle, the member 64 is pushed to its rearward position as shown in Fig. 9, so that the spindle can then again revolve freely. It will be noted that the spindle is positively held against up and down movement. Any expansion of the spindle will take place downwardly, the fit in the nut 56 accommodating this expansion. The machine will have a suitable switch for turning on the current and when this is done, the motors 49 will be driven. The spindles or tool heads 61 will be then individually driven by the belts 69 from the motors 49 and through the belts 55. It will thus be noted that each arm 48 carries its individual driving mechanism which moves with said arm. The counter-weights 80 will be suitably adjusted so that a perfect counter-balance of the arms 48 about the axis of the shaft 35 is obtained. It will be understood that if the work to be operated upon is flat or does not need to be turned, it will be supported upon the tables 126, being bolted thereto by the usual clamps or bolts which will extend through the slots in said table. The tables are very easily and quickly placed in position by placing the same on top of member 97 and inserting the forward plates 127 under the heads 124ª of the clamping rods 124. The rear side of the table is then rested on the top of the member 90, this member being sufficiently spaced from member 97 so that the bolts 127 at the rear of the table will not strike the heads 122ª. The member 90 is now drawn toward the member 97 by the operator rotating the crank 99 and the rods 122 move into the slots in the rear plates 127 and the heads 122ª then move over said plates. The table 126 is thus held from movement by the plates 127 and the heads 124ª and 122ª are tightened down on plates 127 by hand wheels 123 and 125 respectively, so that the table is securely held in place. The operator now moves the tool in the central or tracer arm 48 over the pattern and through the members 77 and 78. All of the tools 68 are thus simultaneously moved and will cut the work held on the tables 126 or in the centers 102 and 120ª as the case may be, in accordance with the contour of the pattern. It will be seen that the tools can be moved forwardly and rearwardly, at which time the wheels or drums 34 will move forwardly and rearwardly on the track rails 33. The tools can be raised up and down with practically no effort, at which time the arms 48 swing about the axis of the shaft 35. The tools can also be moved laterally to the right or to the left with great ease, at which time the arms 48 will swing about the axis of the screws 47. The tools are thus universally movable and each tool is separately driven. If the work is held in the centers 102 and 120ª and is to be turned in the progress of carving, the operator need only turn the crank 118. This will, through chain 117, turn shafts 111 and 106 and all of the members 103 will simultaneously be turned so that all will be operated on in the same manner by the various tools.

As before stated, it is quite important that no dirt collect on the track rails 33 and these rails are protected against dirt and refuse by the guard member 41 and by the curtains 43. As the shaft 35 moves forwardly and rearwardly, it will contact the members 45ᵇ of the yoke 45 and the curtains 43 will thus be folded at one side of the shaft and pulled out or extended at the other so that it is always in position to protect the rails 33. The up and down movements of the arms 48 are limited and said arms are kept from dropping down by the engagement of member 82 with the angle member 83.

From the above description it is seen that applicant has provided a very efficient and easily operated carving machine in which the tools are universally movable and all of the adjustments can be easily and quickly made. The machine is quite simple in construction, can be easily made and assembled and very easily and efficiently operated. The same has been amply demonstrated in actual practice and found to be very successful and efficient.

It will, of course, be understood that various changes may be made in the form, details, arrangement and proportions of the parts, without departing from the scope of applicant's invention, which, generally stated, consists in a device capable of carrying out the objects above set forth, in the novel parts and combinations of parts disclosed and defined in the appended claims.

What is claimed is:—

1. A carving machine having in combination, a frame, a member extending longitudinally of said frame, said member provided with rollers movable in said frame on which said member is mounted for oscillation about its longitudinal axis, forwardly and rearwardly extending guideways in which said rollers respectively move, a plurality of arms pivotally connected to said member and movable about axes extending substantially at right angles to the axis thereof, said arms each carrying a vertically extending carving tool adjacent one end thereof.

2. A carving machine having in combination, a frame, a member extending longitudinally of said frame oscillatable about a longitudinal axis and freely movable forwardly and rearwardly in said frame in a horizontal plane, a plurality of spaced arms swingingly mounted on said member, a vertically extending revoluble cutting tool carried at the forward end of each of said arms, and a driving means for said tool carried by each of said arms including a motor secured at the rear end of certain of said arms and constituting a counterweight.

3. A carving machine having in combination, a laterally oscillating arm, a tool carrying spindle revolubly mounted in said arm, means for holding the tool in said spindle, a pulley having a bore receiving said spindle, said pulley having a groove in one surface thereof, said spindle having a flattened portion of longer dimension than the bore in said pulley and disposed in said groove and a plate through which said spindle passes movable transversely thereof and having a slot adapted to embrace said flattened portion of said spindle to prevent rotation thereof.

4. A carving machine having in combination, an arm having a recess at its top, a ball-bearing casing disposed in said recess having inner and outer races, a cap fitting over said bearing engaging said casing and secured to said arm preventing vertical movement of said casing, a spindle having a reduced portion extending through the inner race of said ball-bearing casing and threaded to receive a nut engaging the top of said inner race, said spindle having a portion engaging the under side of the ball bearing, whereby vertical movement of said spindle is prevented and a bearing for said spindle spaced from said ball-bearing.

5. A carving machine having in combination, a frame, a member extending longitudinally thereof, oscillatable about a longitudinal axis, a plurality of arms separately and swingingly mounted on said member for oscillation about axes arranged in planes extending substantially at right angles to the axis of the oscillatable member, tool carrying spindles respectively revolubly mounted in the forward ends of each of said arms, said arms being arranged in pairs, each pair of arms being provided with an electric motor mounted at the opposite side of the oscillatable member from the tool carrying spindle to swing with said arms and a common driving means for each pair of spindles and means for operating said driving means from said motor.

6. A carving machine having in combination, a frame, a member extending longitudinally thereof, a plurality of tool carrying arms mounted on said member, rails extending forwardly and rearwardly of said frame at each end thereof, wheels movable on said rails carrying said member, and a fabric curtain movable with each of said wheels comprising a guard member for excluding dirt from said rails.

7. A carving machine having in combination, a frame, a member extending longitudinally thereof, a plurality of tool carrying arms mounted on said member, rails extending forwardly and rearwardly of said frame at each end thereof, wheels movable on said rails carrying said member, a casing surrounding each of said rails and the wheel movable thereon, a pair of fabric curtains disposed in each of said casings for excluding dirt from said rail, said curtains being movable by said member.

8. A carving machine having in combination, a plurality of forwardly extending laterally swingable tool carrying arms, a tie member connecting the front ends of said arms having yokes surrounding said arms, vertically alined pivots in said yokes engaging opposite sides of said arms, said yokes having arms extending at each side and means connecting said latter arms.

9. A carving machine having in combination, a frame, a member extending longitudinally thereof, a plurality of tool carrying arms mounted on said member, rails extending forwardly and rearwardly of said frame at each end thereof, wheels movable on said rails carrying said member, a casing surrounding each of said rails and a wheel movable thereon, a member having vertical portions at each side of said first mentioned member and movable therewith, a pair of curtains each secured at one end at the end of said rails, and secured at its other end to one of said vertical portions respectively, said curtains being movable with said last mentioned member.

10. A carving machine having in combination, a frame having spaced end members constituting guideways, a member extending between said end members having means at its ends movable on said guideways forwardly and rearwardly of said machine in a horizontal plane, said member also being freely oscillatable about its longitudinal axis, a plurality of spaced arms mounted on said member about vertical axes and for free lateral swinging movement about said axes, a vertically extending tool spindle carried in the forward end of each of said arms, means carried by the rear ends of said arms for driving said spindles, means connecting the forward ends of said arms to move the same in unison, and a work carrying means movable vertically in said frame.

11. A carving machine having an oscillatable shaft and means for bodily moving it in a single horizontal plane, a tool carrying arm pivoted on the shaft for lateral movement in a horizontal plane and a motor on the arm on the opposite side of said shaft for operating a tool, the tool and motor shaft extending downwardly from said arm.

12. A carving machine having an oscillatable shaft movable in a plane, tool carrying arms pivoted on said shaft to permit lateral pivotal movement of the arms, a yoke for each arm pivoted thereto by vertically aligned pivots and detachable connections between the yokes of successive arms.

13. A carving machine having a support, tool carrying arms pivoted on said support, each arm being hollowed out at its end and having therein a pulley and an angular tool carrying spindle and a lock slidable in the hollowed out portion for locking the spindle from rotation, said lock having a slot wide at one end and narrower at the other end and embracing the tool spindle.

14. A carving machine having a plurality of tool carrying arms yokes embracing the ends of the arms and connected thereto by vertically aligned pivots engaging the opposite faces of the arms, arms extending from each side of the yokes and sleeves connecting proximate yoke arms.

15. In a machine of the character described an arm, a spindle extending through the arm and having therein a bearing at its upper end said bearing being constructed to prevent radial or endwise movement of the spindle, a tapered sleeve below the bearing through which the spindle passes and means for adjusting the tapered sleeve said spindle having a pulley thereon between said bearing and sleeve.

16. A carving machine having in combination a frame, a member extending longitudinally thereof and mounted for oscillating movement about a longitudinal axis, arms swingingly carried by said member and extending forwardly thereof for oscillation about axes substantially at right angles to said longitudinal axis, a spindle revolubly mounted in each of said arms at the forward end thereof, a pulley having a vertically extending axis and secured to each of said spindles, electric motors and pulleys having vertically extending axes mounted rearwardly from said member and belts extending between said respective pulleys for driving said spindles on the ends of the arms.

17. A carving machine having a horizontal pivoted support, a plurality of tool carrying arms pivoted on said support by substantially vertical pivots for horizontal lateral swinging movement and extending forwardly of said support, each of said arms having means supported on the rear of said support for operating a tool and tending to balance the weight of the arm and tool on said support, each arm having a vertically extending cutting tool and a pulley at the forward end thereof and connections between said means and pulley.

18. A carving machine comprising in combination, a frame provided with parallel guideways, a shaft provided with rollers resting upon said guideways and capable of uniform forwardly and backwardly motion thereon, a supporting member in the form of a hollow shaft having anti-friction supports upon said first named shaft, a plurality of spaced arms mounted upon pivots arranged in planes at right angles to the axis of said supporting member, said arms being capable of free lateral swinging movement, one of said arms being provided with a pattern tracing tool and each of the other arms being provided with a spindle provided with means for securing a carving tool thereto, electric motors arranged at the opposite sides of said supporting member from said tool spindles, said motors being supported by said member, means connecting said motors with the carving tool spindle for driving the same, means connecting the forward ends of said arm to cause the carving tools to move in unison with the tracing tool and work-supporting means mounted in said frame and adapted to hold a pattern for the tracing tool and to hold work to be operated upon by the several carving tools.

19. A carving machine comprising in combination, a frame provided with parallel guideways arranged near the ends of the frame, a shaft provided with rollers resting upon said guideways and capable of rolling forwardly and backwardly thereon in a horizontal plane, means causing said rollers to move in unison upon said guideways, a supporting member in the form of a hollow shaft having an anti-friction support at its ends upon said first named shaft, a plurality of spaced arms pivotally supported upon said hollow shaft, said arms being capable of free lateral swinging movement, one of said arms being provided with a pattern tracing tool, while each of the other arms is provided with a spindle arranged to have a carving tool connected therewith, a series of motors arranged at the opposite side of said supporting member from said tool spindle, the weight of said motors being carried by said supporting member and tending to counterbalance said spaced arms and the tools carried thereby, means connecting said motors with said tool spindles for driving the same, means connecting the forward ends of said arms to cause the carving tools to move in unison with the tracing tool and work-carrying means mounted in said frame to support work in position to be operated upon by said tools.

20. A carving machine having in combination, a plurality of forwardly extending laterally swingable tool carrying arms, each of said arms being provided with a tool carrying spindle, a tie member connecting the tool carrying ends of said arms and comprising independent yokes arranged in proximity to but in the rear of said tool carrying spindles, vertically aligned pivots in said yoke engaging the upper and lower faces of said arms and separable means connecting said yokes.

In testimony whereof I affix my signature.

JOHN GALBRAITH.

CERTIFICATE OF CORRECTION.

Patent No. 1,721,015.  Granted July 16, 1929, to

JOHN GALBRAITH.

It is hereby certified that error appears in the printed specification of the above numbered patent requiring correction as follows: Page 6, strike out lines 75 to 84, comprising claim 15, and for claim numbers "16, 17, 18, 19, and 20" read "15, 16, 17, 18, and 19"; and that the said Letters Patent should be read with this correction therein that the same may conform to the record of the case in the Patent Office.

Signed and sealed this 22nd day of October, A. D. 1929.

(Seal)

M. J. Moore,
Acting Commissioner of Patents.